(12) United States Patent
McLain et al.

(10) Patent No.: US 11,650,562 B2
(45) Date of Patent: May 16, 2023

(54) INTERFACE ASSEMBLIES FOR MANUFACTURING COMPONENTS

(71) Applicants: Toyota Motor Engineering & Manufacturing North America, Inc., Plano, TX (US); Toyota Jidosha Kabushiki Kaisha, Aichi-ken (JP)

(72) Inventors: Patrick McLain, Georgetown, KY (US); Hayato Narita, Aichi (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 890 days.

(21) Appl. No.: 16/550,469

(22) Filed: Aug. 26, 2019

(65) Prior Publication Data

US 2021/0063990 A1 Mar. 4, 2021

(51) Int. Cl.
G05B 19/05 (2006.01)

(52) U.S. Cl.
CPC .... G05B 19/052 (2013.01); *G05B 2219/1214* (2013.01); *G05B 2219/13144* (2013.01)

(58) Field of Classification Search
CPC .......... G05B 19/052; G05B 2219/1214; G05B 2219/13144; G05B 2219/13174;
(Continued)

(56) References Cited

U.S. PATENT DOCUMENTS 5,563,648 A 10/1996 Menand et al.
7,272,451 B2 * 9/2007 Duemler .............. G05B 19/056
715/764

(Continued)

FOREIGN PATENT DOCUMENTS

CN 203336211 U * 12/2013 ................ F16P 7/02
CN 108445438 A 8/2018
(Continued)

OTHER PUBLICATIONS

Park et al, "PLCStudio: Simulation Based PLC Code Verification", 2008, pp. 222-228 downloaded from https://ieeexplore.ieee.org/document/4736071 (Year: 2008).*
Tech-Labs, "Portable PLC Troubleshooting Learning System—Allen Bradley CompactLogix", 2012, pp. 2 https://tech-labs.pro/sites/default/files/990-PAB53F_PortablePLCTroubleshootingLearningSystem-ABCompactLogix_Form6874-A_L.pdf (Year: 2012).*
(Continued)

*Primary Examiner* — Rocio Del Mar Perez-Velez
*Assistant Examiner* — Olvin Lopez Alvarez
(74) *Attorney, Agent, or Firm* — Dinsmore & Shohl LLP

(57) ABSTRACT

Embodiments herein are directed to an assembly having a plurality of machines, a first programmable logic controller device and a second programmable logic controller device commutatively coupled to the first programmable logic controller device. The second programmable logic controller device includes a human machine interface having a display and displaying a plurality of user inputs. A processing device communicatively coupled to the display and a storage medium. The storage medium includes one or more programming instructions that, when executed, cause the processing device to prompt a user to select a desired program, to input a desired line speed time, and to input a plurality of line control data. The data is converted into a simulated data and transferred to the first programmable logic controller device, which causes at least one machine of the plurality of machinery to move in a predetermined manner based on the simulated data.

10 Claims, 6 Drawing Sheets

(58) Field of Classification Search
CPC .......... G05B 2219/13184; G05B 2219/13186;
G05B 2219/23054; G05B 2219/23446;
G05B 2219/2629; G05B 2219/31056;
G05B 2219/31031; G05B 2219/25385;
G06F 30/20
See application file for complete search history.

(56) References Cited

U.S. PATENT DOCUMENTS

| | | |
|---|---|---|
| 7,924,537 B2 | 4/2011 | Mernyk |
| 2002/0124649 A1* | 9/2002 | Kim .................. G05B 19/4145 73/432.1 |
| 2007/0067472 A1 | 3/2007 | Maertens et al. |
| 2009/0089031 A1* | 4/2009 | Sturrock ................ G05B 17/02 703/7 |
| 2010/0174395 A1* | 7/2010 | Gu ........................ G05B 17/02 702/182 |
| 2012/0101613 A1* | 4/2012 | Kapoor ............. G05B 19/0426 901/3 |
| 2013/0066456 A1* | 3/2013 | Russell ................. G06F 30/17 700/104 |
| 2015/0019191 A1* | 1/2015 | Maturana .......... G05B 19/0423 703/13 |

FOREIGN PATENT DOCUMENTS

| | | | | |
|---|---|---|---|---|
| EP | 2098677 | * | 9/2009 | .......... G05B 19/042 |
| JP | 5368926 B2 | | 12/2013 | |
| KR | 100462057 B1 | * | 12/2004 | ............. G05B 19/42 |

* cited by examiner

INTERFACE ASSEMBLIES FOR MANUFACTURING COMPONENTS

TECHNICAL FIELD

The present specification generally relates to an interface assembly for controlling machinery and, more specifically, to an interface assembly for remotely simulating data required for the control of machinery in a manufacturing process.

BACKGROUND

Assembly lines in a manufacturing process use a plurality of machines to assemble a product, such as a vehicle. As such, internal software, such as assembly vehicle instruction (AVI), and hardware, such as electrical connections, control or run the plurality of machines at specific intervals and through predetermined routines based on specific vehicle models. For instance, depending on the type of model of the vehicle to be assembled, each of the plurality of machines may have a different routine or sequence of operations. Many times these assembly lines are built offsite and then moved to the final location. As such, verification of each of the plurality of machines responding properly to the software, such as AVI and quality information system (QIS), cannot be performed.

Accordingly, a need exists for verifying of each of the plurality of machines and other inherent systems such as AVI and QIS functionality while the assembly line is still offsite.

SUMMARY

An assembly is provided. The assembly includes a plurality of machines, a first programmable logic controller device and a second programmable logic controller device. The first programmable logic controller device commutatively coupled is to the plurality of machines. The second programmable logic controller device is commutatively coupled to the first programmable logic controller device. The second programmable logic controller device includes a human machine interface having a display configured for displaying a plurality of user inputs, a processing device communicatively coupled to the display and a non-transitory, processor-readable storage medium in communication with the processing device. The non-transitory, processor-readable storage medium comprising one or more programming instructions that, when executed, cause the processing device to prompt, by the human machine interface, a user to select a desired build style, prompt, by the human machine interface, the user to input a desired line speed time and prompt, by the human machine interface, the user to input a plurality of line control data. The user selected and input data is converted into a simulated data and transferred to the first programmable logic controller device, which causes at least one machine of the plurality of machinery to move in a predetermined manner based on the simulated data.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to systems and methods for a portable interface assembly configured to verify programing and hardwiring of an AVI system, a QIS system, and line control functions of an assembly line that is external to the portable interface assembly. The portable interface assembly includes a programmable logic controller, a human machine interface, a plurality of receptacle connections, and a plurality of hardware components, such as a plurality of relays mounted onto a circuit board. The programmable logic controller is configured to be communicatively coupled to a machine side programmable logic controller such that data is transferred between the controllers via the plurality of receptacle connections. The human machine interface includes a display with a plurality of predetermined screens configured for a user to select a desired build style, input a desired line speed (i.e., jobs per hour), and input a plurality of line control data.

Once the data is selected or input, the portable interface assembly transmits the user selected data, as simulated data, to the machine side programmable logic controller. This allows the machine side programmable logic controller to toggle or change a plurality of bits from a first position (e.g. low) to a second position (e.g. high) and vice-versa, such that a plurality of machines may be made to move in predetermined routines. Further, the plurality of hardware components, such as the plurality of relays, of the portable interface assembly may be used to simulate or run a plurality of machine side relays, such that line stop protocols and other systems relaying on the machine side relays may be simulated. Therefore, the programming and hardwiring of specific systems of assembly lines that are external to the portable interface assembly made be verified or troubleshot, such as the AVI system, the QIS system, and line control functions, without the need to move the entire assembly line to keep the assembly process, the AVI and the QIS systems synchronized.

As used herein, the term "communicatively coupled" means that coupled components are capable of exchanging data signals with one another such as, for example, electrical signals via conductive medium, electromagnetic signals via air, optical signals via optical waveguides, and the like.

Figure 1:
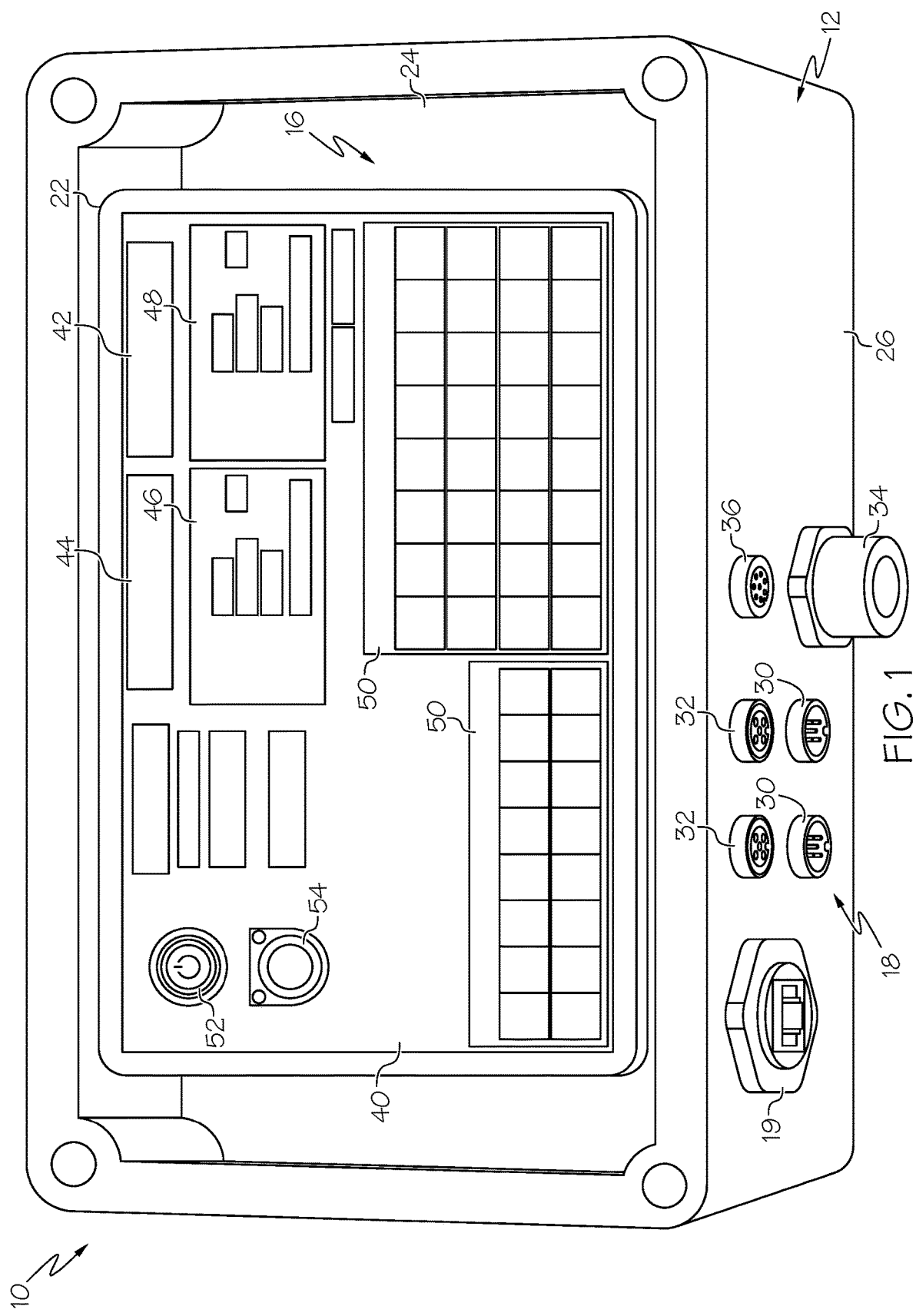
FIG. 1 schematically depicts a portable programmable logic controller device having a human machine interface and a plurality of receptacle connections according to one or more embodiments shown and described herein.

Referring to FIG. 1, the portable interface assembly 10 includes a housing 12 that houses a portable programmable logic controller device 14 (FIG. 4), a human machine interface 16, a plurality of receptacle connections 18, and a control hardware 20 (FIG. 4), such as a plurality of relays. The human machine interface 16 includes a display device 22 with a plurality of predetermined screens configured for a user to select a plurality of data options, as discussed in greater detail herein.

The housing 12 housing defines an interior 24 and an opposite exterior area that includes a wall 26 in which the plurality of receptacle connections 18 are positioned. The plurality of receptacle connections 18 are adapted to receive and secure electrical connectors outside of the housing. In some embodiments, the plurality of receptacle connections 18 includes an Ethernet port 19 configured for a CAT-5 cable, or similar cable, to communicatively couple the portable interface assembly 10 to a machine side programmable logic controller device 28 (FIG. 4), as discussed in greater detail herein.

In some embodiments, the plurality of receptacle connections 18 also includes 4-pin male connectors 30, 4 pin female connectors 32, 8-pin male connectors 34, 8-pin female connectors 36, and the like. It should be appreciated that the plurality of receptacle connections 18 is a non-limiting example and may have any combination of these connectors, more or less of these connectors, or different connectors all together. The plurality of receptacle connections 18 are mated to a circuit board containing the control hardware 20 (FIG. 4), such as a plurality of relays, fuses, resistors, and the like. Electrical cables are connected to the machine side programmable logic controller device 28 (FIG. 4) and to each of the plurality of receptacle connections 18 such that the control hardware 20 (FIG. 4) is in electrical communication with an I/O hardware 38 (FIG. 4) within the machine side programmable logic controller device 28 (FIG. 4), as discussed in greater detail herein.

As such, the control hardware 20 (FIG. 4) may be positioned on the circuit board and commutatively coupled with the plurality of receptacle connections 18 to route and distribute various power and electronic signals via inherent copper traces (it being understood that other circuit boards constructions and designs are also envisioned not limited to any specific material beyond that necessary to function in the desired manner) between the control hardware 20 (FIG. 4) and the I/O hardware 38 (FIG. 4) within the machine side programmable logic controller device 28 (FIG. 4), as discussed in greater detail herein.

Figure 2:
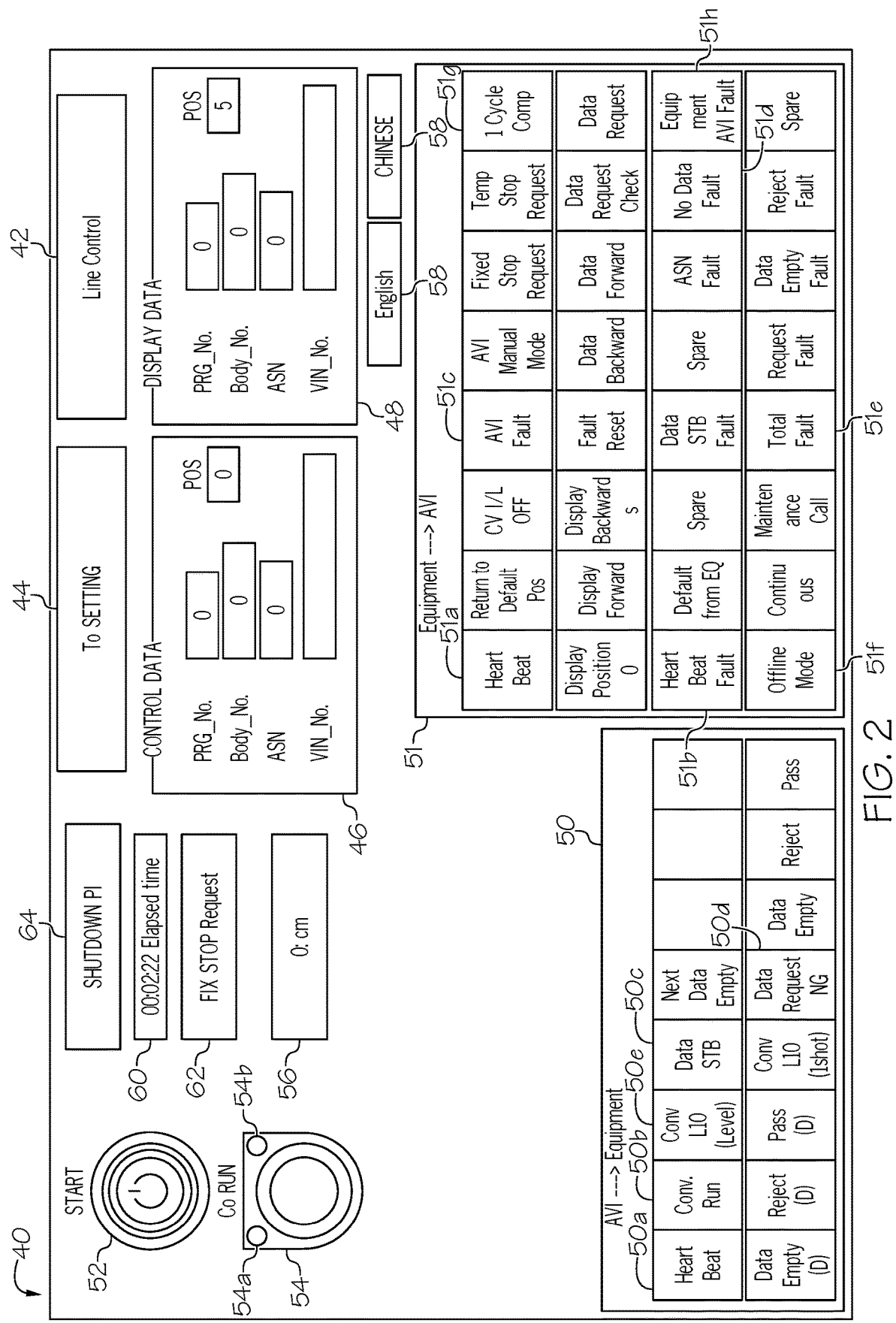
FIG. 2 schematically depicts an overview screen of the human machine interface of FIG. 1 according to one or more embodiments shown and described herein.

With reference now to FIGS. 1 and 2, a display overview 40 on the display device 22 of the human machine interface 16 will be discussed. The display overview 40, as best shown in FIG. 2, is a home screen. As such, the display overview 40 is configured to provide an overview of the user selected programs, simulated data, and confirmation information from the machine side programmable logic controller device 28 (FIG. 4), as discussed in greater detail herein. The display overview 40 provides for a line control selection submenu 42, a setting control submenu 44, a control data 46 and display data 48, an AVI-equipment indicator and selection 50, an equipment-AVI indicator and selection 51, a start touch button 52, and a conveyor run indicator 54. Further, the screen overview may include encoder data 56, language selection 58, an elapsed time counter 60, a stop request button 62, and a human machine interface shut down 64. It should be appreciated that the home screen and any visual indictors, selection submenus, and the like are merely shown for illustrative purposes and thus are non-limiting examples.

Figure 4:
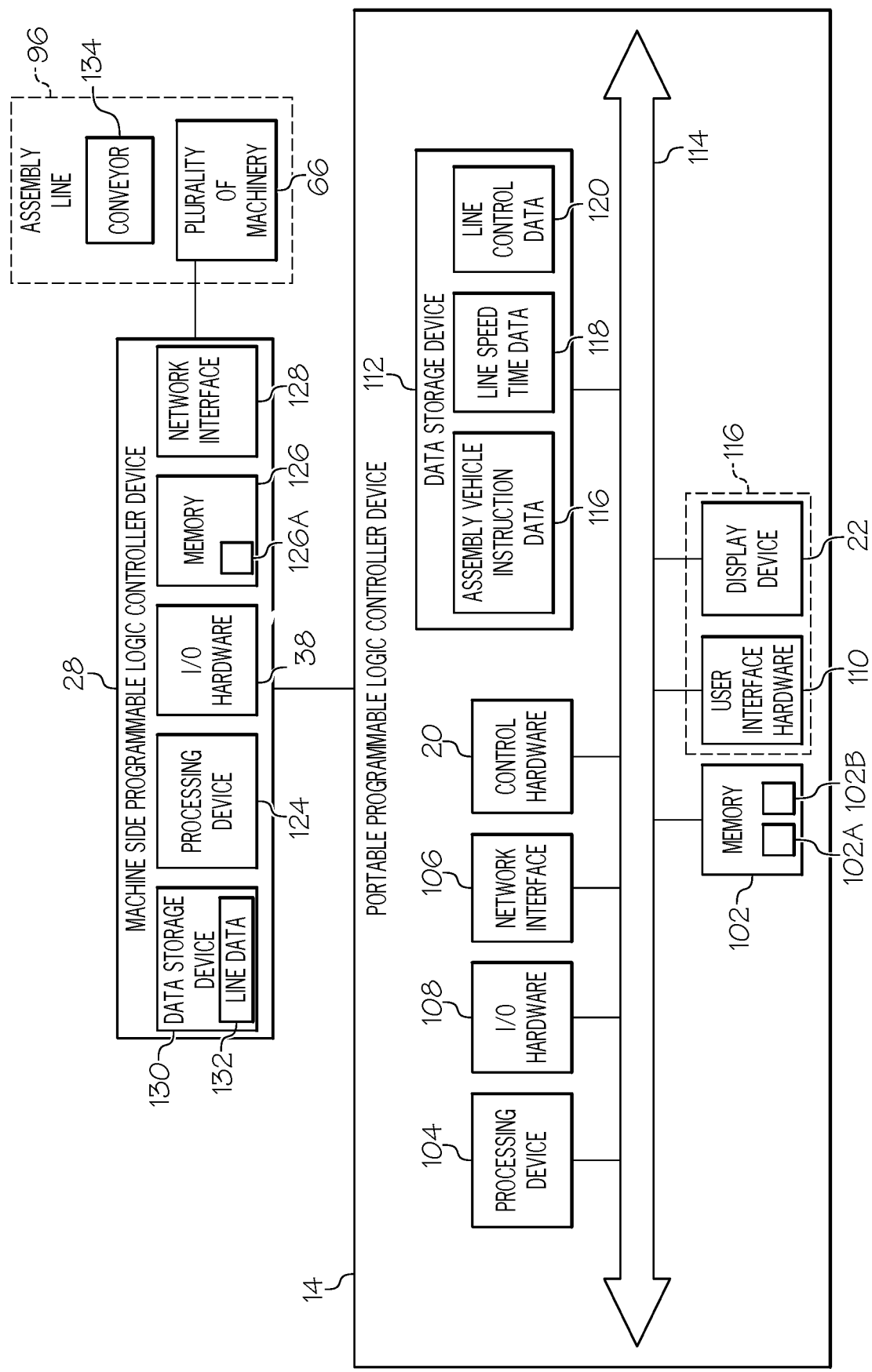
FIG. 4 schematically depicts a block diagram of illustrative components of a portable programmable logic controller device of FIG. 1, a machine side programmable logic controller device and an assembly line according to one or more embodiments shown or described herein.

The control data 46 includes displaying the data that corresponds to a desired build style selected by the user. The display data 48 is a mirror image of the build style selected by the user, but is the data that will be displayed on a plurality of screens of the human machine interface 16 coupled to the machine side programmable logic controller device 28 (FIG. 4). That is, the display data is the data that will be displayed external to the portable interface assembly 10. The encoder data 56 is a value or register number received from the machine side programmable logic controller device 28 (FIG. 4) and is indicative of a shaft of a motor's position that is configured to drive machinery, such as a conveyor 134. It should be appreciated that the encoder data 56 may be a dynamic value that changes upon movement of the shaft of the motor. The conveyor run indicator 54 includes two indicators, one for conveyor run on 54a and one for conveyor run off 54b.

The AVI-equipment indicator and selection 50 provides for visual indicators of the communication between from the portable programmable logic controller device 14 (FIG. 4) to the machine side programmable logic controller device 28 (FIG. 4). For example, the user may monitor the following data sent to the machine side programmable logic controller device 28 (FIG. 4) during data simulation: a heartbeat monitor 50a, a conveyor run monitor 50b, a data strobe 50c, a data request 50d, a data check 50e, and the like. It should be appreciated that this data is monitored remotely from an assembly line 96 and is from the portable programmable logic controller device 14 (FIG. 4) and the machine side programmable logic controller device 28 (FIG. 4).

The equipment-AVI indicator and selection 51 provides for visual indicators of the communication from the machine side programmable logic controller device 28 (FIG. 4) to the portable programmable logic controller device 14 (FIG. 4). For example, the user may monitor the following data received from the machine side programmable logic controller device 28 (FIG. 4) during data simulation: a heartbeat monitor 51a, a heartbeat fault 51b, an AVI fault 51c, a no data fault 51d, a total fault 51e, an offline mode 51f, a cycle complete 51g, a equipment AVI fault 51h, and the like. It should be appreciated that this data is monitored remotely from the assembly line 96 and is provided from a plurality of machinery 66 (FIG. 4) commutatively coupled to the machine side programmable logic controller device 28 (FIG. 4).

Figure 3A:
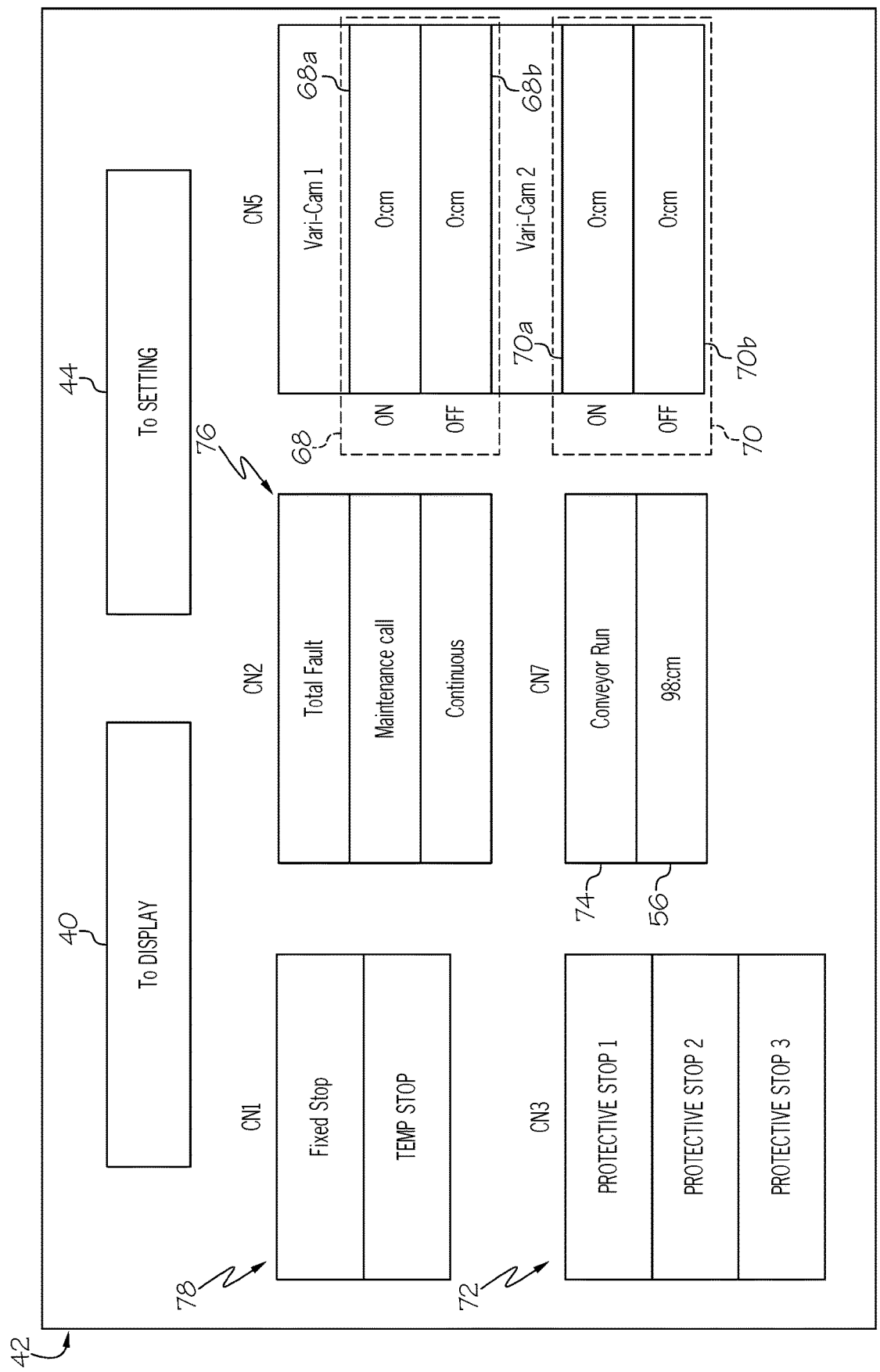
FIG. 3A schematically depicts a desired line speed program select screen of the human machine interface of FIG. 1 according to one or more embodiments shown and described herein.

Now referring to FIG. 3A, the line control selection submenu 42 will be described. The line control selection submenu 42 includes options for a user-initiated programing of a Vari-Cam limit switch. In particular, the line control selection submenu 42 may include a first Vari-Cam limit switch register 68 and a second Vari-Cam limit switch register 70. It should be appreciated that the Vari-Cam limit switch registers 68, 70 are needed due to the possibility that some of the equipment within the assembly line 96 (FIG. 4) (i.e., the conveyor 134 (FIG. 4), the plurality of machinery 66 (FIG. 4), and the like) has to be started from a specific position in the working pitch. As such, the Vari-Cam limit switch registers 68, 70 programmable switches that use conveyor encoder position to determine position of conveyor and sends signal to the equipment. As such, the Vari-Cam limit switch register uses the encoder data register 56 and the on register 68a and the off register 68b and/or the on register 70a and the off register 70b to determine when to turn on and off the control hardware 20 (FIG. 4), such as at least one of the relays. The programming of the Vari-Cam limit switch registers 68, 70 is advantageous to overcome issues when at least one of the plurality of machinery 66 (FIG. 4) is not engaged with the vehicle moving down the assembly line 96 (FIG. 4), which inhibits the conveyor 134 (FIG. 4) from advancing the vehicle until the each of the plurality of machinery 66 (FIG. 4) has started and/or completed its process. It should be appreciated that the Vari-Cam limit switch registers 68, 70 may be programmed for any encoder value such that the operation behind (i.e., next build style in the AVI que) may be simulated or to ensure that the plurality of machinery 66 (FIG. 4) has obtained a cycle complete before interfering with other processes. Further, the Vari-Cam limit switch registers 68, 70 may be used in place of a physical limit switch that a vehicle carrier makes contact when passing by during the traveling from station-to-station along the assembly process is out of position and causing a timing problem.

The line control selection submenu 42 further includes monitoring of the protective stops 72 that may be toggled during the data simulation. In some embodiments, the control hardware 20 (FIG. 4), such as at least one of the relays, may be used in the conveyor run sequence and/or conveyor stop sequence. The line control selection submenu 42 further includes a conveyor status 74*a* fault status 76 and a stop status 78.

Figure 3B:
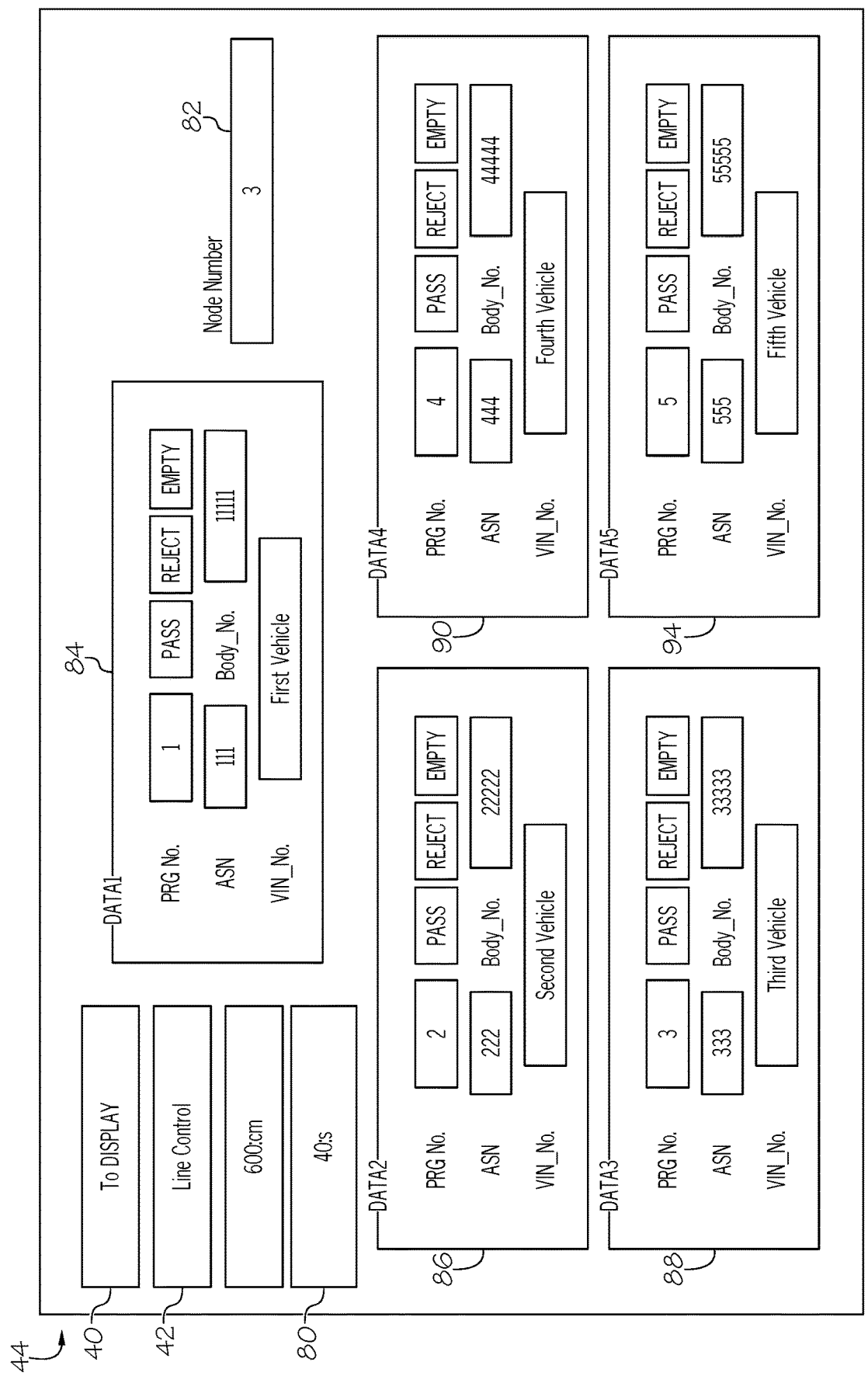
FIG. 3B schematically depicts a program select screen of the human machine interface of FIG. 1 according to one or more embodiments shown and described herein.

Now referring to FIG. 3B, the setting control submenu 44 will be described. The setting control submenu 44 is used to establish the desired build style in the AVI system such that the assembly line 96 (FIG. 4) (i.e., the conveyor 134 (FIG. 4) and the plurality of machinery 66 (FIG. 4) therein) is sequenced to the same build style. The setting control submenu 44 includes a user initiated line control entry 80 options for a user-initiated programing of a line speed time (i.e., a jobs built per hour, TAKT time, and the like). It should be appreciated that the current line speed as illustrated in FIG. 3B is programmed for 40 seconds. That is, the manufacturing process for each particular process of the plurality of machinery 66 (FIG. 4) along this particular conveyor is completed every 40 seconds (e.g., a 40 second cycle time). Further, as is known by those skilled in the art, each one of the plurality of machinery 66 (FIG. 4) is addressed with a particular node number along the conveyor system. The node number may be a DeviceNet node, a FL-Net node, and the like. As such, this is a unique identifier for that conveyor system, a cell, and the like that needs to be programmed with the line speed. The setting control submenu 44 includes a current node number 82 that the user may program and/or monitor to ensure the proper conveyor, proper plurality of machinery, and the like, is set at the user controlled line speed. The setting control submenu 44 also permits the user to input the desired build sequence via inputting the desired program number, which in turn uploads that build style into the simulated AVI style to be transmitted to the machine side programmable logic controller device 28 (FIG. 4). The setting control submenu 44 displays the simulated AVI data for the first vehicle behind the current vehicle 84, the second vehicle behind the current vehicle 86, the third vehicle behind the current vehicle 88, the fourth vehicle behind the current vehicle 90 and the fifth vehicle behind the current vehicle 92. It should be appreciated that each of these queues may be entered by the user or may be received from the machine side programmable logic controller device 28 (FIG. 4). Each display includes AVI information required for proper sequencing of the build and the assembly line 96 (FIG. 4). For example, the program number is displayed, the advanced shipping notice number, the body number, and the vehicle identification number are displayed, which is the data required by the machine side programmable logic controller device 28 (FIG. 4) such that the assembly line 96 assembles the proper build style.

FIG. 4 depicts various illustrative internal components of the portable programmable logic controller device 14, the machine side programmable logic controller device 28 and the assembly line 96 communicatively coupled together according to embodiments. More specifically, the portable programmable logic controller device 14 may be communicatively coupled to the machine side programmable logic controller device 28 and the machine side programmable logic controller device 28 may be communicatively coupled to the assembly line 96. In some embodiments the components of the portable programmable logic controller device 14, the machine side programmable logic controller device 28 and the assembly line 96 communicatively coupled together via Ethernet and hard wired electrical connections. In other embodiments, components of the portable programmable logic controller device 14, the machine side programmable logic controller device 28 and the assembly line 96 communicatively coupled together via a network, such as a wide area network (WAN), such as the Internet, a local area network (LAN), a mobile communications network, a public service telephone network (PSTN), a personal area network (PAN), a metropolitan area network (MAN), a virtual private network (VPN), and/or another network that can electronically connect the components of the portable programmable logic controller device 14, the machine side programmable logic controller device 28 and the assembly line 96 together.

The portable programmable logic controller device 14 may be a non-transitory computer-readable medium for completing the various processes described herein, embodied as hardware, software, and/or firmware, according to embodiments shown and described herein. While in some embodiments the portable programmable logic controller device 14 may be configured as a general-purpose computer with the requisite hardware, software, and/or firmware, in other embodiments, the portable programmable logic controller device 14 may also be configured as a special purpose computer designed specifically for performing the functionality described herein. For example, the portable programmable logic controller device 14 may be a device that is particularly adapted to transmit user selected and/or input data to the machine side programmable logic controller device 28, as simulated data. In response, the machine side programmable logic controller device 28 may toggle or change a plurality of bits from a first position (e.g. low) to a second position (e.g. high) and vice-versa. The toggling of the plurality of bits may cause at least one of the plurality of machines to move in predetermined routines. As such, the assembly line 96 and the components therein (i.e., the conveyor 134, the plurality of machinery 66, and the like) can be verified or troubleshot. In another example, the portable programmable logic controller device 14 may be a device that is particularly adapted to receive an input and control the control hardware 20, such as the plurality of relays, to simulate or run a plurality of machine side relays, limit switches, and/or the like. In response, line stop protocols and other systems relying on the machine side relays, the limit switches, and/or the like, may be simulated such that other equipment (i.e., the conveyor 134, the plurality of machinery 66, and the like) may move.

In embodiments where the portable programmable logic controller device 14 is a general purpose computer, the systems and methods described herein provide a mechanism for improving functionality by determining the user selected and/or input data and transmitting the data as the simulated data to the machine side programmable logic controller device 28. In response, the machine side programmable logic controller device 28 may toggle or change a plurality of bits from a first position (e.g. low) to a second position (e.g. high) and vice-versa. The toggling of the plurality of bits may cause at least one of the plurality of machines to move in predetermined routines. As such, the assembly line 96 and the components therein (i.e., the conveyor 134, the plurality of machinery 66, and the like) can be verified or troubleshot.

Still referring to FIG. 4, in various embodiments, the portable programmable logic controller device 14 may include, but is not limited to, a memory component 102, a processing device 104, a network interface 106, an I/O hardware 108, the control hardware 20, and a data storage device 112. Further, the portable programmable logic controller device 14 may include a user interface hardware 110 and the display device 22, which together are the human machine interface 16. A local interface 114, such as a bus or the like, may interconnect the various components. For example, the local interface 114 may be an Ethernet connection, a DeviceNet and/or FL-Net connection, and the like.

The processing device 104, such as a computer processing unit (CPU), may be the central processing unit of the portable programmable logic controller device 14, performing calculations and logic operations to execute a program. The processing device 104, alone or in conjunction with the other components, is an illustrative processing device, computing device, processor, or combination thereof. The processing device 104 may include any processing component configured to receive and execute instructions (such as from the memory component 102).

In some embodiments, the memory component 102 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 102 may be a non-transitory, processor-readable memory. The memory component 102 may include one or more programming instructions thereon that, when executed by the processing device 104, cause the processing device 104 to complete various processes, such as one or more of the processes described herein with respect to FIG. 5.

Still referring to FIG. 4, the programming instructions stored on the memory component 102 may be embodied as one or more software logic modules 102, where each logic module 102*a* provides programming instructions for completing one or more tasks, as described in greater detail below with respect to FIG. 5. That is, the logic module 102 includes a plurality of different pieces of logic, each of which may be embodied as a computer program, firmware, and/or software/hardware, which may be executable by the processing device 104. For example an operating logic 102*a*, and a simulated data logic 102*b* (each of which may be embodied as a computer program, firmware, or hardware, as an example). The operating logic 102*a* may include an operating system and/or other software for managing components of the portable programmable logic controller device 14. Further, the operating logic 102*a* may contain one or more software modules for transmitting data, analyzing data, receiving data, and the like.

The simulated data logic 102*b* may contain one or more software modules for transmitting user selected data and user input data as simulated data. In one example, the simulated data may be used by the machine side programmable logic controller to toggle or change a plurality of bits from a first position (e.g. low) to a second position (e.g. high) and vice-versa, which causes at least one of the plurality of machines to move in predetermined routines to verify or troubleshoot the assembly line and the plurality of machines therein. In another example, the simulated data may transmit simulated data such the plurality of hardware components, such as the plurality of relays, simulate or run a plurality of machine side relays, limit switches, and/or the like.

The network interface 106 may include any wired or wireless networking hardware, such as a modem, LAN port, wireless fidelity (Wi-Fi) card, WiMax card, Ethernet, mobile communications hardware, and/or other hardware for communicating with other networks and/or devices. Therefore, the communication between the portable programmable logic controller device 14, the machine side programmable logic controller device 28, and ultimately, the assembly line 96 may be provided through the network interface 106. In one example, as discussed above, the portable programmable logic controller device 14 communicates with the machine side programmable logic controller device 28 via the Ethernet connection.

It should be appreciated that the user selected programs and values, such as the desired build style program, desired line speed time, and desired line control data, as discussed in greater detail herein, may be transmitted to the machine side programmable logic controller device 28 and, ultimately, the assembly line 96 through the network interface 106. Further, it should be appreciated that the user may select the user selected data and the user input data (i.e., desired build style program, desired line speed time, and desired line control data) by a button, such as a push button, a switch, such as a toggle switch, and the like on the display device 22 of the human machine interface 16 (i.e., the display overview 40 (FIG. 1), the line control selection submenu 42 (FIG. 3A), and the setting control submenu 44 (FIG. 3B)).

The data storage device 112, which may generally be a storage medium, may contain one or more data repositories for storing data that is received and/or generated, and may be any physical storage medium, including, but not limited to, a hard disk drive (HDD), memory, removable storage, and/or the like. While the data storage device 112 is depicted as a local device, it should be understood that the data storage device 112 may be a remote storage device, such as, for example, a server computing device or the like. Illustrative data that may be contained within the data storage device 112 includes, but is not limited to, an assembly vehicle instruction data 116, a line speed time data 118, and a line control data 120. The assembly vehicle instruction data 116 may contain the user selected build style data, system generated build styles data, machine side programmable logic controller device 28 generated build style data, and the like. The line speed time data 118 may contain the user selected desired line speed data (i.e., jobs per hour, units per minute, and the like), the line speed data generated from the machine side programmable logic controller device 28, and the like. The line control data 120 may contain user selected data such as the Vari-Cam data registers and data generated by the components of the portable programmable logic controller device 14, such as, protective stop data, fault data, conveyor status data, and the like. Further, the line control data 120 may contain data generated from the machine side programmable logic controller device 28, such as encoder data, fault data, heat beat data, cycle data, and the like.

Still referring to FIG. 4, the I/O hardware 108 may communicate information between the local interface 114 and one or more other components. For example, the I/O hardware 108 may act as an interface between the processing device 104 and other components, such as I/O received from the assembly line 96 via the machine side programmable logic controller device 28, and/or the like. In some embodiments, the I/O hardware 108 may be utilized to transmit one or more commands to the other components.

The user interface hardware 110 may generally provide the processing device 104 with an ability to interface with one or more devices such as, for example, the display device 22 such that the user may select the user selected data, such as the desired build style data, the line control data, the line speed time data, and the like, as discussed in greater detail herein. Communication with devices may occur using various communication ports (not shown). An illustrative communication port may be attached to a communications network.

Still referring to FIG. 4, the machine side programmable logic controller device 28 will now be discussed. It should be appreciated that the machine side programmable logic controller device 28, in various embodiments, may generally include, but is not limited to, a processing device 124, a memory component 126, the I/O hardware 38, a network interface 128, and a data storage device 130. It should be appreciated that the machine side programmable logic controller device 28 is a programmable logic controller device appreciated by those skilled in the art and commonly found in an assembly application. As such, for brevity reasons, general descriptions of the components of the machine side programmable logic controller device 28 will be provided. It should be understood that there may be more or fewer components and that each component described herein may have more or less functionality, as appreciated by those skilled in the art.

The processing device 124 may be the central processing unit of the machine side programmable logic controller device 28, performing calculations and logic operations to execute a program. The processing device 104 may include any processing component configured to receive and execute instructions (such as from the memory component 126). The memory component 126 may be a non-transitory, processor-readable memory. The memory component 126 may include one or more programming instructions thereon that, when executed by the processing device 124, cause the processing device 124 to complete various processes, such as one or more of the processes described herein with respect to FIG. 5. The programming instructions stored on the memory component 126 may be embodied as one or more software logic modules 124a, where each logic module 124a provides programming instructions for completing one or more tasks, as described in greater detail below with respect to FIG. 5. For example, an operating logic 124a, may include an operating system and/or other software for managing components of the machine side programmable logic controller device 28. Further, the operating logic 102a may contain one or more software modules for transmitting data, analyzing data, receiving data, and the like such that the processing device 124 transmits and receives signals from the assembly line 96 that causes the conveyor 134 and/or at least one of the plurality of machinery 66 to move.

The network interface hardware 128 may include any wired or wireless networking hardware, such as a modem, a LAN port, a wireless fidelity (Wi-Fi) card, WiMax card, mobile communications hardware, and/or other hardware for communicating with other networks and/or devices. Therefore, the communication between the machine side programmable logic controller device 28 and the assembly line 96 may be provided through the network interface 106. As discussed above, the machine side programmable logic controller device 28 communicates with the portable programmable logic controller device 14 and vice versa via the Ethernet connection.

Still referring to FIG. 4, the I/O hardware 38 may communicate information between the machine side programmable logic controller device 28 and the assembly line 96. For example, the I/O hardware 38 may act as an interface between the processing device 124 and the conveyor 134, the plurality of machinery 66 and the like. In some embodiments, the I/O hardware 38 may be utilized to transmit or receive one or more commands from other components, such as the conveyor 134, the plurality of machinery 66 and the like. For example, as appreciated by those skilled in the art, to simulate or physically move the conveyor 134 or the plurality of machinery 66 requires a plurality of specific inputs and outputs between the machine side programmable logic controller device 28 and the assembly line 96, such as build style, relay I/O, limit switch I/O and the like.

The data storage device 130 of the machine side programmable logic controller device 28 may contain one or more data repositories for storing data that is received and/or generated, such as a line data 132. The line data may include data related to the conveyor 134, the plurality of machinery 66, and the like. For example, encoder data, limit switch positions, start and stop positions of vehicle carriers, and the like.

Still referring to FIG. 4, the assembly line 96 will now be discussed. It should be appreciated that the assembly line 96, in various embodiments, may generally include, but is not limited to, the conveyor 134 and the plurality of machinery 66. It should be appreciated that the assembly line 96 is known by those skilled in the art and commonly found in assembly applications. As such, for brevity reasons, general descriptions of the components of the assembly line 96 will be provided. It should be understood that there are generally more components and that each component described herein may have more or less functionality, as appreciated by those skilled in the art.

The conveyor 134 is generally a motor assembly configured to advance vehicle carriers at a desired speed to achieve a job-per-hour rate through a particular assembly application, such as, without limitation, a brake fill test or a vision system verification. The plurality of machinery 66 may include robots, armor starts that may hydraulic applications and/or pneumatic applications such as valves, lifts, GD&T tooling, and the like.

It should be understood that the components illustrated in FIG. 4 are merely illustrative and are not intended to limit the scope of this disclosure.

Figure 5:
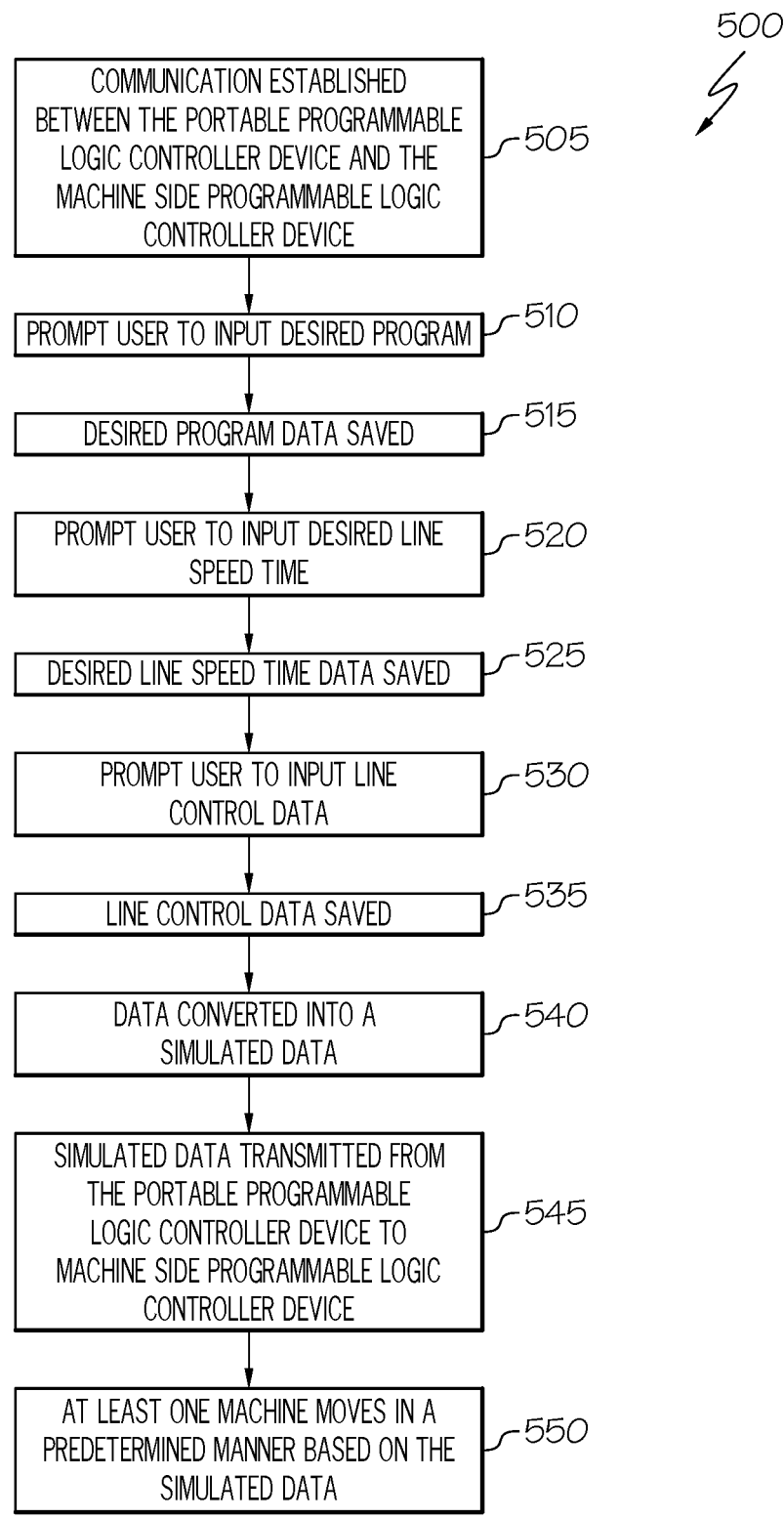
FIG. 5 depicts a flowchart of an illustrative method carried out by the portable programmable logic controller device of FIG. 1, and a machine side programmable logic controller device and an assembly line of FIG. 4 according to one or more embodiments shown or described herein.

Now referring to FIG. 5, a flowchart of an illustrative method 500 of a line control of the assembly line via the portable programmable logic controller device and the machine side programmable logic controller device of FIG. 4 is depicted. At block 505, communication is established between the portable programmable logic controller device and the machine side programmable logic controller device. As discussed herein, the communication may be established via Ethernet communication, FL-Net communication, via electrical connections with the plurality of receptacle connections, and the like. At block 510, the user is prompted to input the desired program. The desired program may be a build style available through the AVI system of the assembly line (i.e., may be data programmed and stored within the machine side programmable logic controller device) and thus may vary on every assembly line, facility, and the like. The selected desired data is saved, at block 515.

At block 520, the user is prompted to input the desired line speed time. The desired line speed time may be a build time set for a predetermined jobs-per-hour or in-station cycle time. It should be appreciated that the desired line speed time permits the conveyor, and/or the plurality of machinery to move through predetermined programs at the selected cycle time. It should be appreciated that this is advantageous in trials of new equipment, especially at an offsite build location, for trouble shooting, and the like, such that the equipment moves at the cycle time speed. It should also be appreciated that the options for the desired line speed time may vary by the assembly line, the process, and the like, and thus may vary on every assembly line, facility, and the like. The selected desired line time data is saved, at block 525.

At block 530, the user is prompted to input the desired line control data. The desired line control data may include data for the Vari-Cam registers. It should be appreciated that the desired line control data permits the conveyor and/or the plurality of machinery to move through predetermined programs by making the bits required for the machine side programmable logic controller device to enable movement of the conveyor and/or the plurality of machinery. It should also be appreciated that the options for the desired line control data may vary by the assembly line, the process, and the like, and thus may vary on every assembly line, facility, and the like. The selected desired line control data is saved, at block 535.

At block 540, the data is converted into a simulated data and the simulated data is transmitted from the portable programmable logic controller device to the machine side programmable logic controller device, at block 545. It should be appreciated that the transmitted simulated data to the machine side programmable logic controller may toggle or change a plurality of bits from a first position (e.g. low) to a second position (e.g. high) and vice-versa, such that the conveyor and/or the plurality of machines may be made to move in predetermined routines, at block 550. It should be appreciated that the conveyor and/or at least one of the plurality of machinery may move at the desired line speed time without changing the synchronization of the line. Further, the plurality of hardware components, such as the plurality of relays, of the portable interface assembly may be used to simulate or run a plurality of machine side relays, such that line stop protocols and other systems relaying on the machine side relays may be simulated. Therefore, the programming and hardwiring of specific systems of assembly lines that are external to the portable interface assembly made be verified, trialed, or troubleshot, at full speed, for various build styles, without the need to change the synchronization of the line.

What is claimed is:

1. An assembly comprising:
    a plurality of machinery;
    a first programmable logic controller device commutatively coupled to the plurality of machinery to cause the plurality of machinery to move in a predetermined manner based on a predetermined build sequence, the movement generates a machine data;
    a second programmable logic controller device commutatively coupled to the first programmable logic controller device, the second programmable logic controller device comprising:
        a human machine interface having a display configured for displaying a plurality of user inputs;
        a processing device communicatively coupled to the display;
        a storage medium in communication with the processing device, the processing device configured to:
            prompt, by the human machine interface, a user to select a desired build style,
            following the selection of the desired build style, prompt, by the human machine interface, the user to input a desired line speed time,
            following the selection of the desired line speed time, prompt, by the human machine interface, the user to input a plurality of line control data,
            convert the user selected and input data into a first data, and
            transmit the first data to the first programmable logic controller device and monitor the machine data received in response to the transmitted first data for a plurality of fault data,
    wherein the first data causes actual or simulated movement of at least one machine of the plurality of machinery and maintains a synchronization of the predetermined build sequence.

2. The assembly of claim 1 wherein the second programmable logic controller device is portable.

3. The assembly of claim 1, wherein:
    the second programmable logic controller device further comprises a housing,
    wherein the housing defines an interior area and an exterior area, a plurality of receptacle connections are positioned along a wall of the exterior area.

4. The assembly of claim 3, wherein the interior area of the housing further comprises:
    a plurality of relays,
    wherein the plurality of relays are configured to drive the plurality of machinery.

5. The assembly of claim 4, wherein the plurality of relays are communicatively coupled to the plurality of machinery via the plurality of receptacle connections such that the plurality of relays control a plurality of inputs and outputs of the plurality of machinery.

6. The assembly of claim 5, wherein the plurality of relays of the second programmable controller device drives a plurality of protective stops for a plurality machine relays associated with the plurality of machinery.

7. The assembly of claim 1, wherein the desired build style is an assembly vehicle instruction.

8. The assembly of claim 1, wherein the second programmable logic controller device is commutatively coupled to the first programmable logic controller device via Ethernet.

9. The assembly of claim 1, wherein the desired line speed time is a line speed rate associated with a jobs-per-hour predetermined speed for the plurality of machinery.

10. The assembly of claim 1, wherein the plurality of line control data includes at least one limit switch register.

* * * * *

UNITED STATES PATENT AND TRADEMARK OFFICE
CERTIFICATE OF CORRECTION

PATENT NO. : 11,650,562 B2
APPLICATION NO. : 16/550469
DATED : May 16, 2023
INVENTOR(S) : Patrick McLain and Hayato Narita It is certified that error appears in the above-identified patent and that said Letters Patent is hereby corrected as shown below:

On the Title Page

Item (73), assignee 2, city, delete "Toyota" and insert --Toyota-Shi Aichi-ken--, therefor.

In the Claims

In Column 12, Line(s) 31, Claim 2, after "claim 1", insert --,--.

Signed and Sealed this
Twenty-eighth Day of November, 2023

Katherine Kelly Vidal
*Director of the United States Patent and Trademark Office*